July 21, 1953 G. B. DOREY 2,646,138
BRAKE SLACK ADJUSTER
Filed Oct. 23, 1950 6 Sheets-Sheet 6

INVENTOR.
George B. Dorey

Patented July 21, 1953

2,646,138

UNITED STATES PATENT OFFICE 2,646,138

BRAKE SLACK ADJUSTER

George B. Dorey, Montreal, Quebec, Canada, assignor to Continental Transport Appliances, Limited, Montreal, Quebec, Canada, a corporation of Canada Application October 23, 1950, Serial No. 191,625

9 Claims. (Cl. 188—200)

This invention relates to an improved brake slack adjuster for the brake leverage system of a fluid operated brake such as employed in connection with railway cars and the like.

The invention is particularly applicable to a type of brake wherein adjustment in the length of certain of the brake rods is effected by a screw take up device operable by means responsive to excessive travel of the brake applying means in order to maintain piston travel within the required limits of 7 to 9 inches and compensate for wear in the brake shoes and pin connections.

The objects of the invention among others are: to provide an improved screw operated take up device for the center top rod; to provide for operation of the take up device by means of a bell crank lever having one arm extending across the plane of the push rod and actuated thereby for movement in one direction and provide suitable mechanism for operating in the opposite direction; to provide a guiding runway applicable to the push rod for supporting and operating an arm of a take up actuating lever for operating the adjusting mechanism; to provide an improved resilient mechanism for retaining spring tension and releasing the same at a predetermined extent of push rod travel; and to provide an automatically operable brake slack adjuster which will also have additional provision for manual operation whereby minor adjustments in the take up mechanism may be manually effected.

The invention further resides in details of construction concerned with the mounting of the bell crank lever and the operation thereof and also with the spring mechanism and its mounting.

For further comprehension of my invention reference may be had to the accompanying drawings wherein.

In said drawings the improvement is shown as applied to a railway car of conventional design and including the usual center sills 10—10 carrying a bracket 11 to which is bolted or otherwise secured the brake cylinder 12. Associated with the brake cylinder is a longitudinally movable push rod 12a having a stem 13 and a pair of spaced jaws 14—14, said rod being longitudinally movable in a forward direction on the admission of compressed air in the cylinder through the inlet pipe 15. Sandwiched between the pair of jaws 14—14 is one of the brake levers 16 and pivotally united therewith by means of a headed pin 17.

Leading from the outer end of the push rod is a hand brake chain connection 18 which is connected therewith by means of a clevis 19 which straddles the push rod jaws 14—14 and also receives the pin 17.

Pivotally connected to the end of the lever 16 remote from the push rod is a top rod 20 which leads to one of the trucks (not shown) and intermediate its ends said lever is connected to a center tie rod 21 which at its opposite end connects with the brake lever arrangement leading to the brake shoes at the opposite end of the car (not shown). The center tie rod is divided lengthwise into two sections 22 and 23 and the ends of the respective sections are screw threaded to present right and left hand screw threads as indicated at 24 and 25 respectively and co-operating with said threaded ends is a complementary threaded turnbuckle 26 having tubular extensions 27 and 28 welded thereto.

The said extensions form supports and housings enclosing the threaded end sections of the tie rod and on the section 28 which lies proximate to the lever 16 there is fitted on the outer end thereof an annular flange 29 having an outer circular surface 30 of extended length and side edge portions 31. Spaced axially from the annular flange 29 there is a ratchet wheel member 32 welded or otherwise non-rotatably secured to the section 28.

Rotation of the screw take up device is effected through the medium of a bell crank lever 33 including angularly related arms as indicated at 34 and 35 respectively, the arm 34 extending in the general direction of the center tie rod for engagement with the teeth of the ratchet wheel as will hereinafter be pointed out and the adjacent arm 35 is extended in the general direction of the lever 16 and across the plane of the push rod 12a to engage with an upstanding abutment 36 movable in unison with the push rod.

The abutment 36 preferably forms part of a guide 37 which includes a platform 38 disposed above the stem 13 of the push rod and extended lengthwise beyond the jaws 14 to form a runway extending beyond the push rod. The platform 38 of the guide preferably consists of a flat plate bent upwardly to present the abutment 36 which is preferably of convex shape. The platform at its outer end is preferably welded to the clevis 19 and thus forms part of the clevis structure. Adjacent its inner end the platform is provided with a downwardly extending pedestal 39 which seats on the stem 13 of the push rod.

The pedestal 39 is preferably in the form of a flat metal plate welded to the underside of the platform at 40 and extending in diagonal relation across the plane of the push rod and formed with an elongated opening 41 embracing the stem of the push rod.

The opening 41 is of key shape with an entrance opening 42 restricted to a width corresponding substantially to the diameter of the push rod stem whereby the said stem will enter the restricted opening only when in right angular relation to the plane of the pedestal plate. Upon deflection of the pedestal plate from a right angular relation with respect to the push rod stem the sides of the elongated opening 41 impinge on the sides of the said push rod stem and the inwardly projecting lugs 43 of the key shaped opening extend beneath the stem preventing upward or lateral movement of the said guide 37, it being understood that the welded connection with the clevis operates to anchor the outer end of the member. The platform plate is formed with an opening 44 within which the head 45 of the pin 17 is housed thus permitting the arm 35 to ride freely over the said pin 17.

The arm 35 of the bell crank lever 33 is preferably formed of two main parts including a long upper arm 46 and a lower short arm 47 suitably secured together. One of the arms of the bell crank, which, in the present embodiment of my invention, is the lower arm 47, is of Z shape to form in combination with the other member a forked end which straddles a pair of fulcrum members 48—48. Each said fulcrum member 48 includes a body section 49 of semicircular formation which has an inner concave surface 50 and side wall sections 51 and 52. The said concave surface 50 and side wall sections 51 and 52 combine to form a channel shaped member and upon positioning the pair of members in facing relation there is provided a hollow chambered member which embraces the annular flange 29. Each of said members are formed with trunnion projections 53 with a face of semicircular shape and a flat wall 54 so arranged that when the members are arranged in facing relation with the flat walls meeting the semicircularly shaped trunnions combine to form a complete circular trunnion. Said circularly shaped trunnions are received in similarly circularly shaped apertures 55 formed in the forked ends of the levers.

The bell crank lever is thus mounted on the tie rod structure for universal movement, and as will be understood, the lever is free to swing in a horizontal as well as a vertical plane. The arm 34 is preferably formed of a round bar bent to angular shape to dispose a pivotal section 56 in the general direction of the arm 35 and said section 56 is received in a U-shaped housing 57 between which the respective lever parts 46 and 47 are sandwiched and said housing 57 and the arms 46 and 47 are rigidly united by rivets 58. The angularly bent arms 34 and 56 are braced relatively to each other by a triangular shaped gusset 59 which is welded at 60 and 61 to the respective arms. The edge portion 62 of said gusset 59 operates to limit axial movement of the arm 56 in one direction and axial movement of the arm in the opposite direction is prevented by means of a U-shaped finger 63 which is welded to the end of said arm 56 as at 64. The finger 63 is extended beneath the lever arm 46 to limit the extent of a downward sweep of the arm 34, it being understood that said arm 34 is arranged to pivot about the axis of its companion arm 56 in order to move up and down and have intermittent ratcheting engagement with the teeth of the ratchet wheel member 32.

The upper lever arm 46 which is extended across the plane of the push rod is deflected upwardly as at 65 to rest upon the platform 38 at a level appreciably above the push rod.

The bell crank lever is thus adapted to be moved in one direction in unison with the push rod in its forward movement and resilient compressible mechanism is provided for moving the bell crank in the opposite direction. The said compressible mechanism is disposed to act on the arm 46 at a location intermediate the push rod and tie rod and is connected at one end to the arm 46 by means of pivot 67 and at the opposite end reacts against a bracket plate 68 which is preferably riveted and welded to the center sill and extends outwardly therefrom.

The compressible mechanism includes telescopically related inner and outer shouldered members as indicated at 69 and 70 respectively between which a spring 71 is interposed. The inner member 69 includes a clevis piece 72 having a pair of jaws 73—73 between which the upper lever arm 46 is received and pivotally connected therewith by means of the pivot 67. The end wall of the clevis piece is screw threaded at 75 to receive a corresponding screw threaded rod 76. Said screw threaded rod is disposed between a pair of flat rail sections 77—77 and welded thereto as indicated at 78. At the outer end of the pair of rail sections, the said rails are maintained in spaced relation by means of a thimble 79 and a connecting rivet 80 extending through the said walls and thimble secures the pair of rails together.

A locking pawl 81 is disposed between the pair of rail sections 77—77 and is pivotally mounted on said rails by means of integrally formed trunnions 82—82 which extend laterally outwardly from the respective sides of the pawl 81 and seat within apertures 83—83 formed in the side rail sections. The pawl 81 includes an upper detent portion 84 and a weighted section 85 for biasing the pawl to a normally vertical position. The said pair of wall sections together form a centered carrying means for maintaining the spring in definite axial alignment.

The outer casing member 70 is generally of box shape formation including an upper wall 86, side walls 87—87 and a lower inwardly directed flange 88 at the lower margin of each side wall. The upper wall 86 adjacent the end of the casing proximate to the spring rests on the outwardly projecting bracket plate 68 and is arranged to swivel thereon in a substantially horizontal plane by means of a depending integrally formed circularly shaped trunnion 89 which is received in a correspondingly formed aperture 90 in the bracket plate 68.

Adjacent the outer end of the casing the under surface of the wall 86 is serrated to provide a plurality of ratchet teeth as indicated at 91 with which the detent portion 84 of the pawl is adapted to have co-operating engagement for maintaining the spring in tensioned relation. The under surface 92 of bracket plate 68 is disposed substantially in alignment with the under surface 93 of wall 86 and the upper edge surface 94 of side rail sections 77 extends adjacent thereto and operates as a sliding key for maintaining the parts in proper relation, it being understood that the side rails 77 are retained in close sliding engagement between the upper wall 86 and the lower inwardly directed flanges 88 of the casing.

Figure 12:
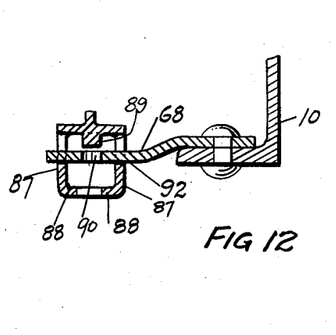
Figure 12 is a vertical sectional view taken through the outer casing and its associated mounting bracket as taken on a line corresponding to a line 12—12 of Figure 10, said view showing the manner in which the said outer casing is applied.
Figures 13, 14, 15, 16, 17, 18:
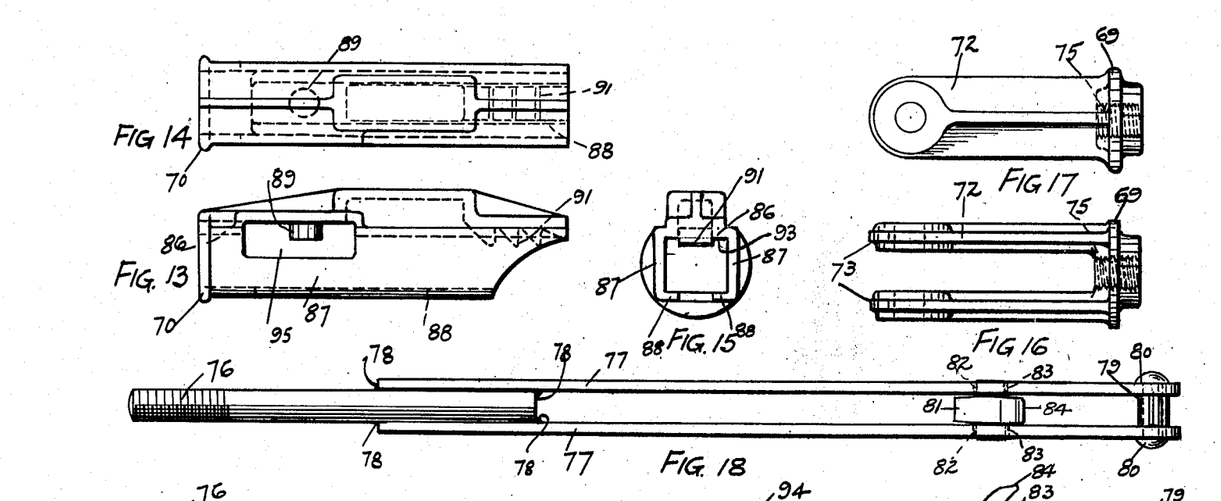
Figure 13 is a detached side elevational view of the outer casing.
Figure 14 is a plan view of the casing shown in Figure 13.
Figure 15 is a vertical end view of the casing shown in Figure 13 as viewed from right to left.
Figure 16 is a vertical side view of the clevis associated with the inner member of the spring mechanism.
Figure 17 is a plan view of the structure shown in Figure 16.
Figure 18 is a plan view of the inner member of the spring mechanism.
Figure 19:
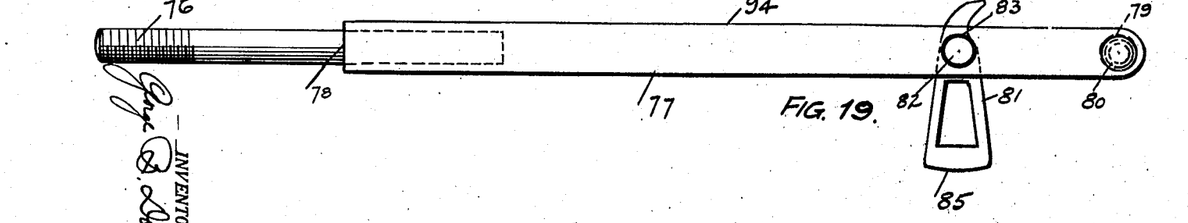
Figure 19 is a vertical side view of the inner member shown in Figure 18.
Figures 20, 21, 22, 23, 24, 25, 26:
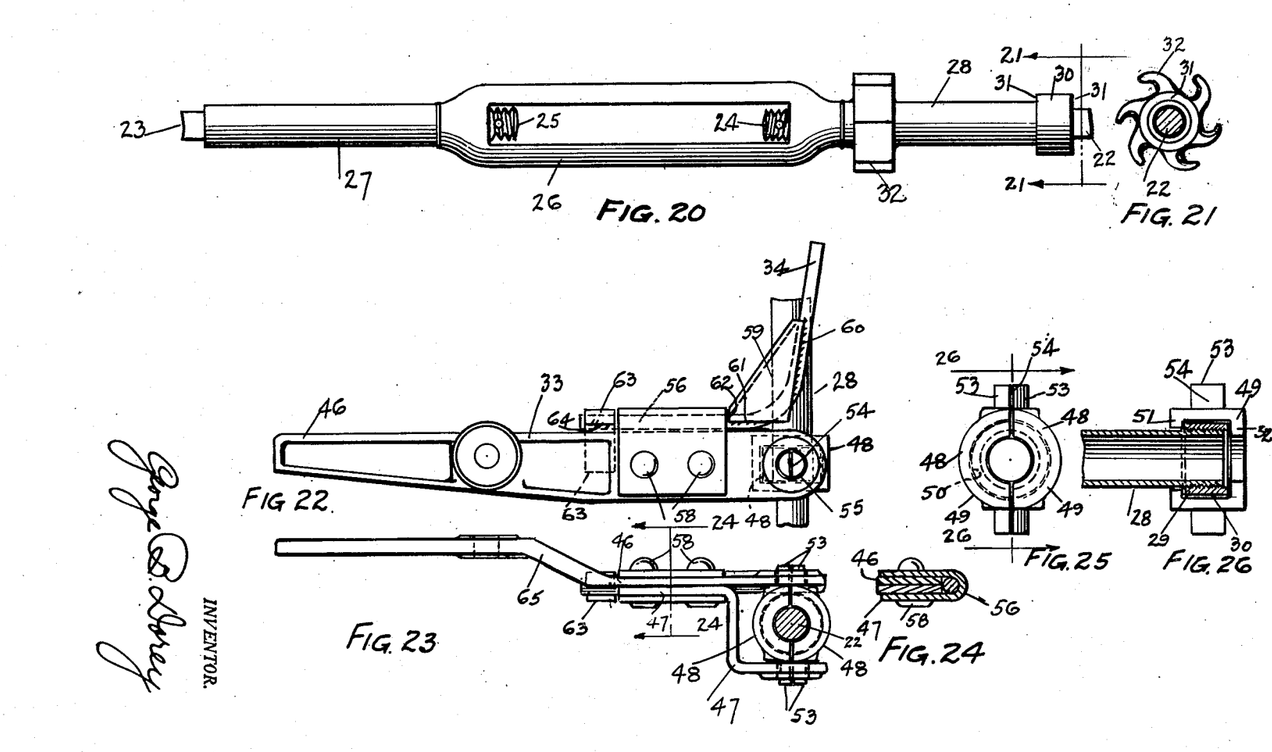
Figure 20 is a plan view of the screw take up assembly.
Figure 21 is a sectional view taken through the screw take up assembly as seen on a line 21—21 of said Figure 20.
Figure 22 is a plan view of the bell crank lever assembly.
Figure 23 is a vertical elevational view of the bell crank lever assembly shown in Figure 22.
Figure 24 is a vertical sectional view taken on a line corresponding to a line 24—24 of Figure 23.
Figure 25 is a vertical end elevational view of the pair of fulcrum members shown in relation to the end portion of the screw take up device.
Figure 26 is a vertical longitudinal sectional view taken through the center of Figure 25 as viewed on a line 26—26 of said Figure 25.

Openings 95 are provided in each side wall 87 for the accommodation of the bracket 68 therethrough and said openings are of sufficient depth to allow such lift of the casing as will allow the trunnion 89 to clear the plate 68 as indicated in Figure 12.

Figures 1, 2:
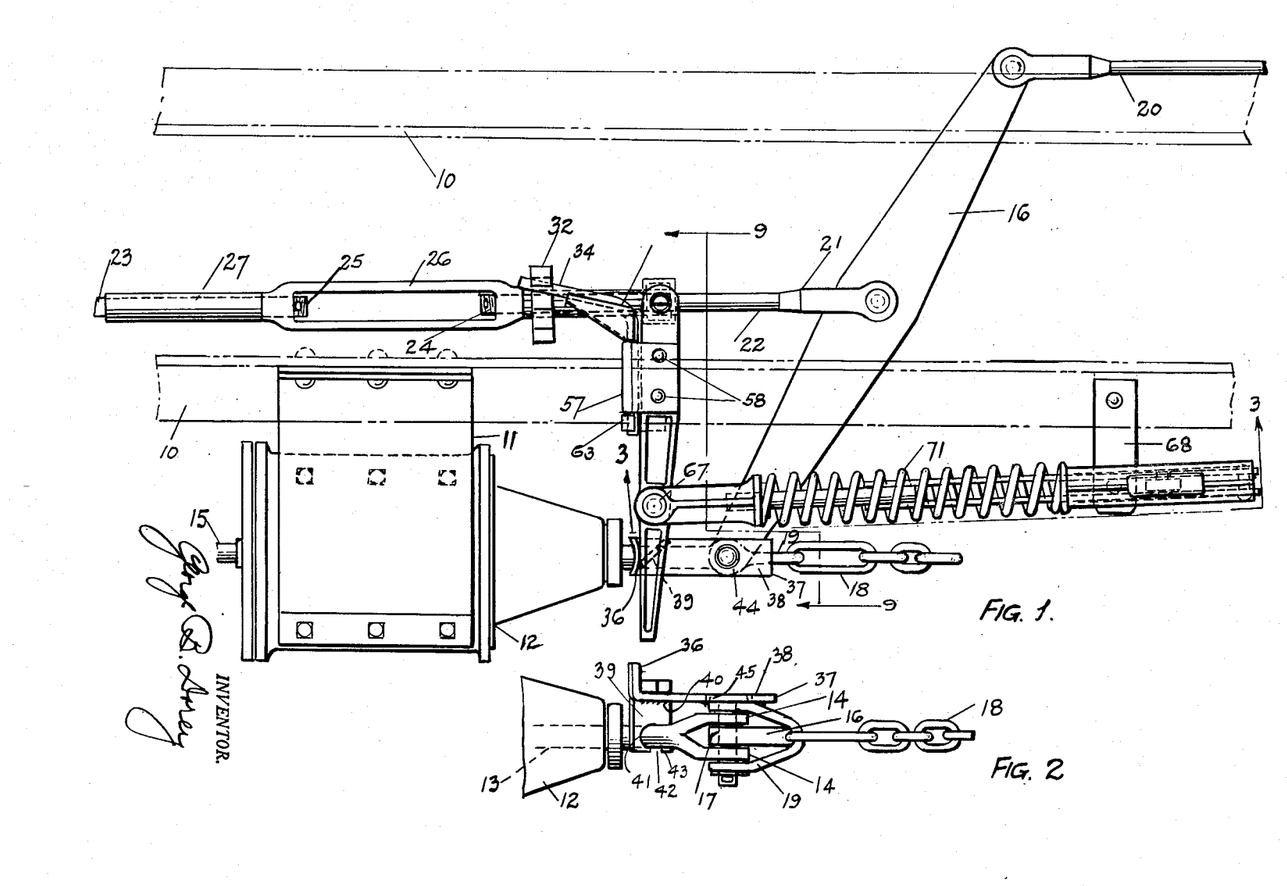
Figure 1 is a plan view showing a portion of a railway car structure and so much of the brake leverage system as necessary to illustrate the application of my improvements thereto, said view showing the parts with the brake in released position.
Figure 2 is a side elevational view of a portion of Figure 1 showing the push rod in relation to the brake cylinder and showing the application of the hand brake connection and the associated runway for supporting and moving the bell crank lever.

The operation of the device may be best understood by following out the sequence of operations involved in a brake applying operation with subsequent return of the brake parts to released position. Assuming the brake in released position as shown in Figure 1 the push rod moves forwardly taking along the bell crank lever by reason of the engagement between abutment 36 and the arm 35, the arm 34 of the bell crank lever during this movement sweeping over the teeth of the ratchet wheel member 32 and moving freely over the same. During this forward movement of the piston, the spring 71 is compressed between the shouldered part of members 69 and 70 and such compression is held by reason of the engagement between pawl 81 and the ratchet teeth 91 of the outer casing. With the spring compression held the push rod returns to normal position, the arm 46 of the bell crank lever meanwhile resting upon the platform 38.

Figure 3:
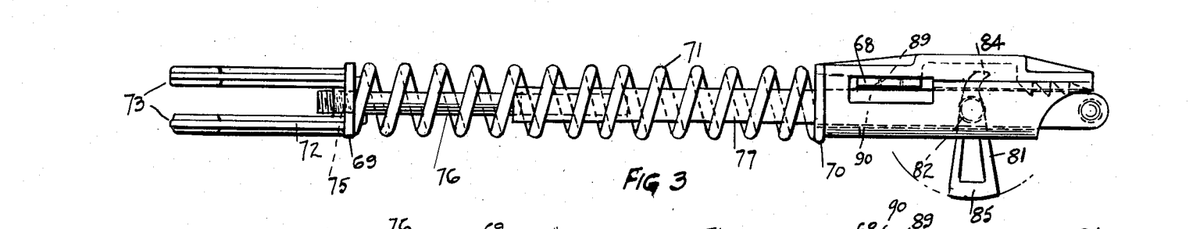
Figure 3 is a side elevational detached view on an enlarged scale of the spring mechanism shown in Figure 1 as viewed on a line 3—3 of said Figure 1, the mechanism being shown in released fully extended position.
Figures 4, 5:
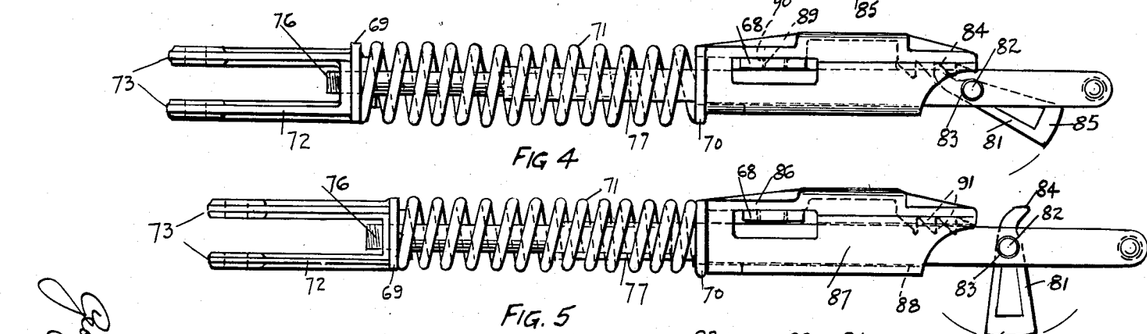
Figure 4 is a view similar to Figure 3 except that the spring is shown in partially compressed position with the pawl retaining the spring under partial compression.
Figure 5 is a view similar to Figures 3 and 4 except that the parts are shown with the spring compressed sufficiently to move the pawl to an overbalanced released position thus allowing return of the parts to the released position as in Figure 3.
Figure 6:
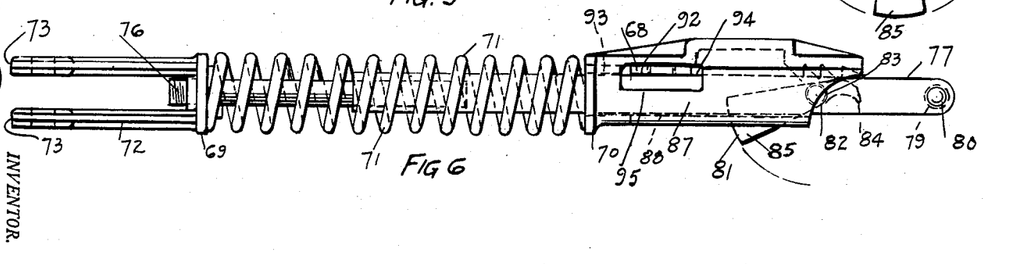
Figure 6 is a view similar to Figures 3-5 inclusive illustrating the position assumed by the locking pawl during the movement of the mechanism to released position.
Figures 7, 8:
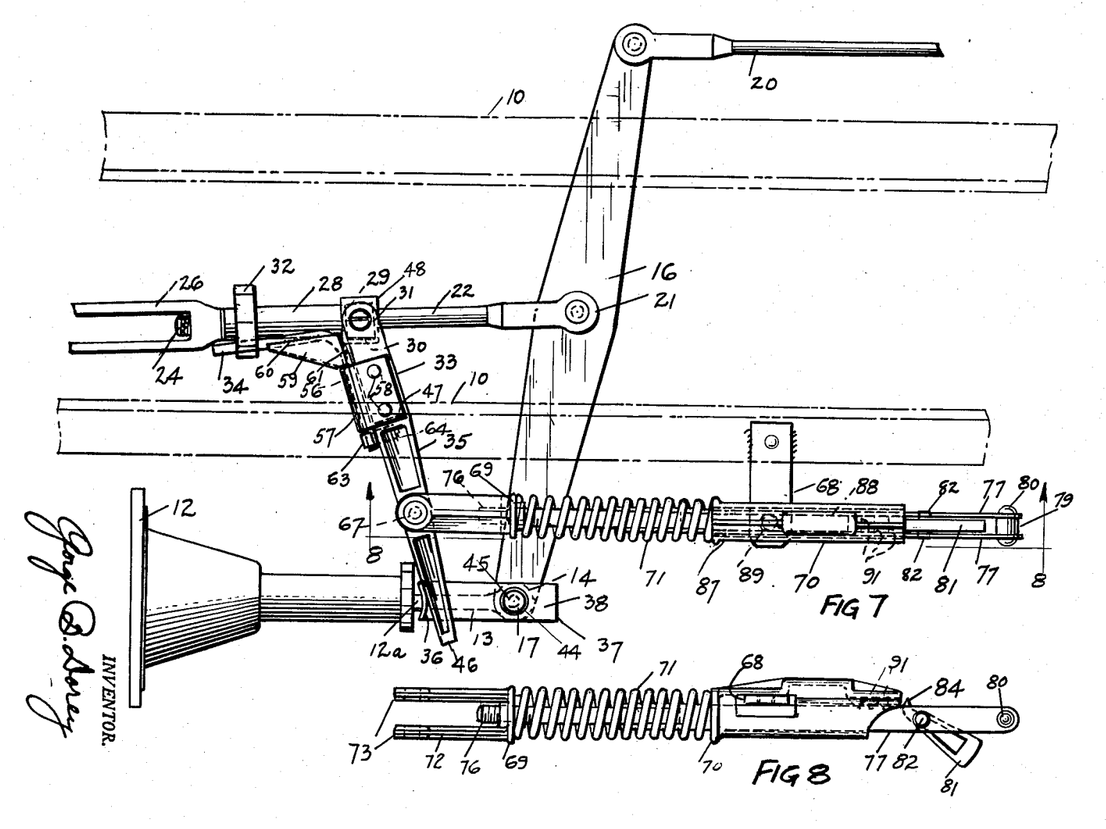
Figure 7 is a plan view similar to Figure 1 except that the brake parts are shown positioned with the push rod moving beyond the 7" minimum piston travel and entering the travel zone wherein release of the spring mechanism becomes effective.
Figure 8 is a side elevational view of the spring mechanism illustrating the position of the parts as the pawl moves to released position, said view being taken on a line 8—8 of Figure 7.
Figure 9:
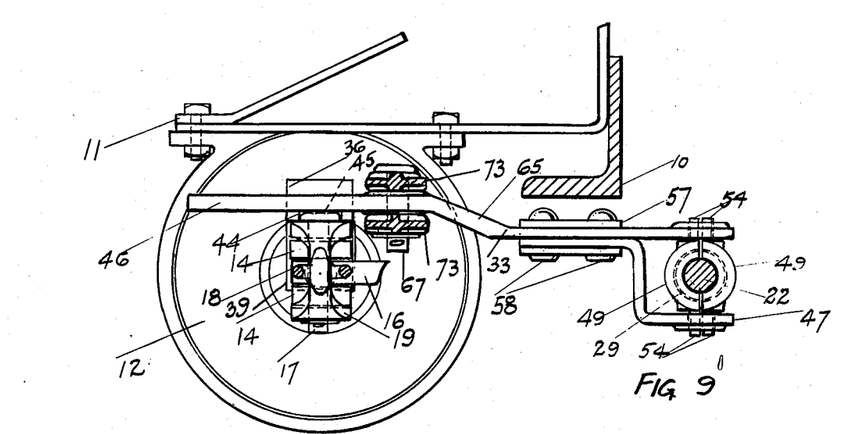
Figure 9 is a vertical sectional view on an enlarged scale taken through the mechanism on a line corresponding to a line 9—9 of Figure 1.
Figures 10, 11:
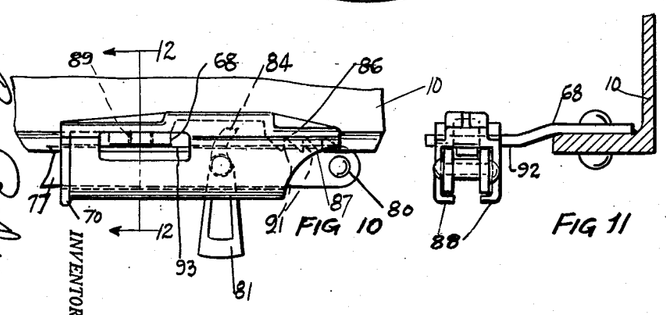
Figure 10 is a vertical side view on an enlarged scale of the outer casing of the spring mechanism illustrating the mounting of the same on its supporting bracket.
Figure 11 is a vertical end view of the structure illustrated in Figure 10 as viewed from right to left.

The operation of the compressible mechanism is well illustrated in Figures 3 to 6 inclusive wherein Figure 3 shows the parts with the brake in released position with the pawl 81 in released position and Figure 4 shows the position of the parts with the brake partially applied and the spring compression held. Figure 5 illustrates the position of the parts upon the development of excessive piston travel when the pawl 81 moves beyond the last tooth and gravitates to released position. Figure 6 illustrates the position of the parts as the pawl moves along the ratchet teeth in overbalanced released position to finally resume the position shown in Figure 3. During the returning movement of the bell crank under the influence of the spring the arm 34 of the bell crank lever drops into engagement with one of the teeth of the ratchet wheel member 32 and rotation of the screw take up device is thereby effected and the tie rod shortened thus automatically shortening the piston travel. The arm 46 is extended laterally beyond the push rod and thus presents a handle well adapted to accommodate a hollow pipe extension lever whereby manual operation of the take up may be effected by oscillation of said arm 46, such manual adjustment being desirable when applying new brake shoes or renewing worn parts. The position of the parts as the pawl 81 overrides the holding teeth and release of the spring occurs is shown in Figure 8.

The screw threaded connection between the clevis and rod members allows for variation in the location where tripping of the pawl takes place and consequently piston travel may be maintained at any point between the regulation limits of 7 and 9 inches of travel.

This invention constitutes an improvement over the inventions disclosed in my copending application Serial No. 152,061, filed March 27, 1950, application Serial No. 164,871, filed May 29, 1950, and application Serial No. 179,046, filed August 12, 1950.

What I claim as new is:

1. In a slack adjuster for the lever system of the air brake of a railway car including a lever and a push rod acting thereon, said push rod being in the form of a stem with a pair of jaws adjacent its outer end, said jaws being disposed to straddle the lever; a hand brake connection leading forwardly from said jaws and including a clevis straddling the jaws; a take up adjusting lever operable by movement of the push rod extending across said push rod and above the same; and a guide for supporting the adjusting lever extending lengthwise of the push rod above the jaws of the clevis and united therewith; said guideway extending lengthwise of the push rod to provide a section overlying the stem, said section overlying the stem having an upwardly extending abutment for engagement with the adjusting lever and a downwardly extending pedestal portion seating on the stem and formed with an opening embracing the stem.

2. In an air brake for a railway car, in combination with the car structure and an air brake cylinder mounted on said structure including a forwardly movable push rod operable by said cylinder, a slack adjuster having a take up device for automatically limiting the extent of push rod travel and including resilient mechanism energized upon forward movement of the push rod; means for retaining said energy until a predetermined extent of push rod travel is reached and releasing said energy upon attainment of said predetermined extent of movement and thereby operating the take up device, said resilient mechanism including oppositely disposed shouldered members and a spring interposed between said respective shoulders, said shouldered members being arranged to move in opposite directions; one of said members being mounted to swivel on the car structure in a substantially horizontal plane and including ratchet teeth and said other member having a pawl pivotally mounted thereto for engaging the ratchet teeth of the companion member to hold the spring energized, said pawl upon excessive travel of the push rod being arranged to move beyond the ratchet teeth and release the spring energy for operation of the take up device.

3. In an air brake for a railway car, in combination with the car structure and an air brake cylinder mounted on said structure including a forwardly movable push rod operable by said cylinder, a slack adjuster having a take up device for automatically limiting the extent of push rod travel and including resilient mechanism energized upon forward movement of the push rod; means for retaining said energy until a predetermined extent of push rod travel is reached and releasing said energy upon attainment of said predetermined extent of movement and thereby operating the take up device, said resilient mechanism including inner and outer shouldered members and a spring interposed between said respective shoulders, said shouldered members being arranged in telescopic relation with the inner member slidingly mounted within the outer member, the said outer member being mounted on the car structure and including ratchet teeth and said inner member having a pawl pivotally mounted with respect thereto for engaging the ratchet teeth of the outer member to hold the spring energized, said pawl upon excessive travel of the push rod being arranged to move beyond the ratchet teeth and release the spring energy for operation of the take up device.

4. In a slack adjuster for the brake system of a railway car including a lever having power applying means acting thereon for applying the brake and a tie rod connected to said lever at an appreciable distance from said power applying means; said tie rod including a screw take up device for adjusting the length of the connection by rotation of said device; means for rotating the device including an operating lever extending towards the power applying means and movable thereby in one direction; and resilient mechanism acting on the operating lever for moving the same in the opposite direction, said mechanism including oppositely shouldered members arranged in telescopic relation with one member sliding within the other and a spring interposed between said shoulders, the outer of said members having ratchet teeth and the inner of said members having a pivoted pawl for engagement with the teeth for retaining the spring under compression, said pawl at a predetermined extent of travel of the power applying means being arranged to move beyond the ratchet teeth and move to an overbalanced released position.

5. In a slack adjuster for the brake system of a railway car including a lever having power applying means acting thereon for applying the brake and adjusting means for automatically varying the position of the levers, said adjusting means being responsive to overtravel of the power applying means and including an adjusting lever movable in one direction by the power applying means and movable in the opposite direction by resilient mechanism arranged to be tensioned during the brake applying operation; said resilient mechanism including inner and outer shouldered members arranged in telescopic relation and having a spring interposed between the shoulders of the respective members, said outer member being mounted for limited swinging movement and having a series of ratchet teeth formed integrally therewith and said inner member having a pawl pivotally mounted thereon for engagement with the ratchet teeth for maintaining the spring in tensioned position, said pawl upon excessive movement of the power applying means being arranged to move free of the ratchet teeth to assume an overbalanced released position and release the spring tension.

6. In a slack adjuster for the brake system of a railway car including a lever having movable power applying means acting thereon and means for automatically adjusting the travel of the power applying means by means responsive to overtravel of the said power applying means and including an adjusting lever movable in one direction by the power applying means and movable in the opposite direction by resilient mechanism arranged to be tensioned during the brake applying operation; said resilient mechanism including telescopically related shouldered members including an outer member and an inner member; and a spring interposed between said shoulders of the respective members, said outer member being anchored to the car structure and having ratchet teeth formed therein and said inner member including a pair of rails arranged in spaced relation; and a pawl disposed between said rails and pivotally mounted thereon, said pawl co-operating with the ratchet teeth for retaining the spring tension, said pawl being arranged to move beyond the teeth of the outer casing and swing to a released position.

7. In a slack adjuster for the brake system of a railway car including a lever having movable power applying means acting thereon and means for automatically adjusting the travel of the power applying means by means responsive to overtravel of the said power applying means and including an adjusting lever movable in one direction by the power applying means and movable in the opposite direction by resilient mechanism arranged to be tensioned during the brake applying operation; said resilient mechanism being interposed between the adjusting lever and the car structure and including telescopically related shouldered members including an outer casing and an inner relatively movable member and a spring interposed between said shoulders, said outer casing being of box shape including an upper wall having ratchet teeth on the undersurface thereof and side walls each having an inwardly directed lower flange spaced from the upper wall, and said inner member including a pair of rails spaced apart and a pawl pivotally mounted therebetween for co-operating engagement with the ratchet teeth, said rails being arranged to slide between the upper wall and lower flanges and be guided thereby, said pawl upon overtravel of the power applying means being arranged to move beyond the ratchet teeth and free thereof to release the spring tension.

8. In a slack adjuster for the brake system of a railway car including a lever having movable power applying means acting thereon and means for automatically adjusting the travel of the power applying means by means responsive to overtravel of the latter and including an adjusting lever movable in one direction by the power applying means and movable in the opposite direction by resilient mechanism arranged to be tensioned during the brake applying operation; said resilient mechanism including telescopically related oppositely shouldered members including an outer casing and an inner relatively movable member and a spring interposed between said shoulders; said inner member including a clevis member straddling the adjusting lever and pivoted thereto and formed with a screw threaded head and an inner core extending within the spring and including a screw threaded bar co-operating with the threaded portion of the clevis and a pair of spaced side rails secured to the respective sides of the rod, said rails being extended within the casing; a pawl mounted between said rails, and ratchet teeth on the casing co-operating with the pawl for retaining the spring tension; said pawl at a predetermined extent of telescopic travel being adapted to move to release position and release the spring tension.

9. In a slack adjuster for the brake system of a railway car including a lever having movable power applying means acting thereon and means for automatically adjusting the travel of the power applying means by means responsive to overtravel of the latter and including an adjusting lever movable in one direction by the power applying means and movable in the opposite direction by resilient mechanism arranged to be tensioned during the brake applying operation; said resilient mechanism including telescopically related inner and outer shouldered members and a spring interposed therebetween, said outer member being in the form of a casing including a flat upper wall section and side walls having inwardly directed flanges, a trunnion depending from the upper wall adjacent one end of the casing and ratchet teeth on the undersurface of the upper wall adjacent the opposite end of the casing; a plate bracket secured to the car structure and underlying the upper wall of the casing, said bracket being apertured for receiving the trunnion and said side walls having openings for accommodating the bracket plate therethrough and allowing an upward lift of the casing to dispose the trunnion above the plate and clear thereof; said inner member including a pair of spaced rails extending through the casing and lying between the bracket plate and the inwardly directed flanges of the side walls and operating to key the casing in operative relation with the trunnion in the aperture of the bracket plate; and a pawl disposed between the rails and pivotally mounted thereon for engagement with the ratchet teeth of the casing and retaining the spring tension, said pawl at a predetermined extent of piston travel being adapted to move beyond the teeth and release the spring tension.

GEORGE B. DOREY.

References Cited in the file of this patent
UNITED STATES PATENTS

| Number | Name | Date |
|---|---|---|
| 795,401 | Leigh | July 25, 1905 |
| 1,560,980 | De Camp | Nov. 10, 1925 |